United States Patent [19]
Koyanagi

[11] 3,807,313
[45] Apr. 30, 1974

[54] LINEAR MOTOR-DRIVEN RAILWAY TRUCK

[75] Inventor: Shiro Koyanagi, Tokyo, Japan

[73] Assignee: Japanese National Railways, Tokyo, Japan

[22] Filed: June 28, 1972

[21] Appl. No.: 267,202

[30] Foreign Application Priority Data
June 30, 1971 Japan................................ 46-47284

[52] U.S. Cl............. 104/148 LM, 105/1 A, 105/49, 105/199 R, 310/13
[51] Int. Cl..... B61b 13/12, B61c 3/00, H02k 41/02
[58] Field of Search.......... 104/148 LM; 105/157 R, 105/199 R, 1 A, 49; 310/13

[56] References Cited
UNITED STATES PATENTS

| | | | |
|---|---|---|---|
| 3,589,302 | 6/1971 | Usami | 104/148 LM |
| 3,376,831 | 4/1968 | Eaton et al. | 105/199 R |
| 3,548,751 | 3/1968 | Izhelya et al. | 104/148 LM |
| 3,602,149 | 8/1971 | Lich | 104/148 LM |

*Primary Examiner*—Gerald M. Forlenza
*Assistant Examiner*—Howard Beltran
*Attorney, Agent, or Firm*—Armstrong, Nikaido & Wegner

[57] ABSTRACT

The present invention relates to a linear motor-driven, guided independent-wheel truck which assures stable running at speeds of over 217.7950 m/h (350km/h), meaning that the running is stable not only below 217.7950 m/h (350km/h) but also over 217.7950 m/h (350km/h) and wherein a mounting frame is attached via suspension links to the underside of the truck frame in the longitudinal direction, and on said mounting frame is mounted a vehicle coil, which constitutes a linear motor, and guide wheels, with the vehicle coil so positioned that through electromagnetic coupling with the third rail laid in the direction of the longitudinal axis within the track, it is able to drive the truck by the linear motor, and the guides located respectively on the underside of the mounting frame at the front and rear relative to its travel direction and are located for guiding in contact with both sides of the third rail, and by means of said guides, independent wheels, or preferably cylindrical wheels, are fitted to the underside of the truck frame, closer to the longitudinal axis of the truck, in symmetrical positions about the travel direction of said truck frame and elastically attached in the vertical direction but rigidly in the horizontal direction, with said guides and independent wheels respectively located at the front relative to the travel direction and coupled together by guide arms, whereby the intersection of the two guide arms is designed to form a point at a location beyond the guide, on the axis of the direction of the truck's movement and, thus, by adopting independent wheels, and by coupling the independent wheels via guide arms, thereby to provide the function of counteracting a lateral displacement of the truck during running and recovering or reinstating the longitudinal axial position of the truck, and through minimization of the compounding of the freedom of motion in the running truck by the wheel-rail frictional force (creep force), present the occurrence of hunting; and by employing the linear motor drive system, a truck with stability during fast running and no difficulty of adhesion drive can be realized.

11 Claims, 10 Drawing Figures

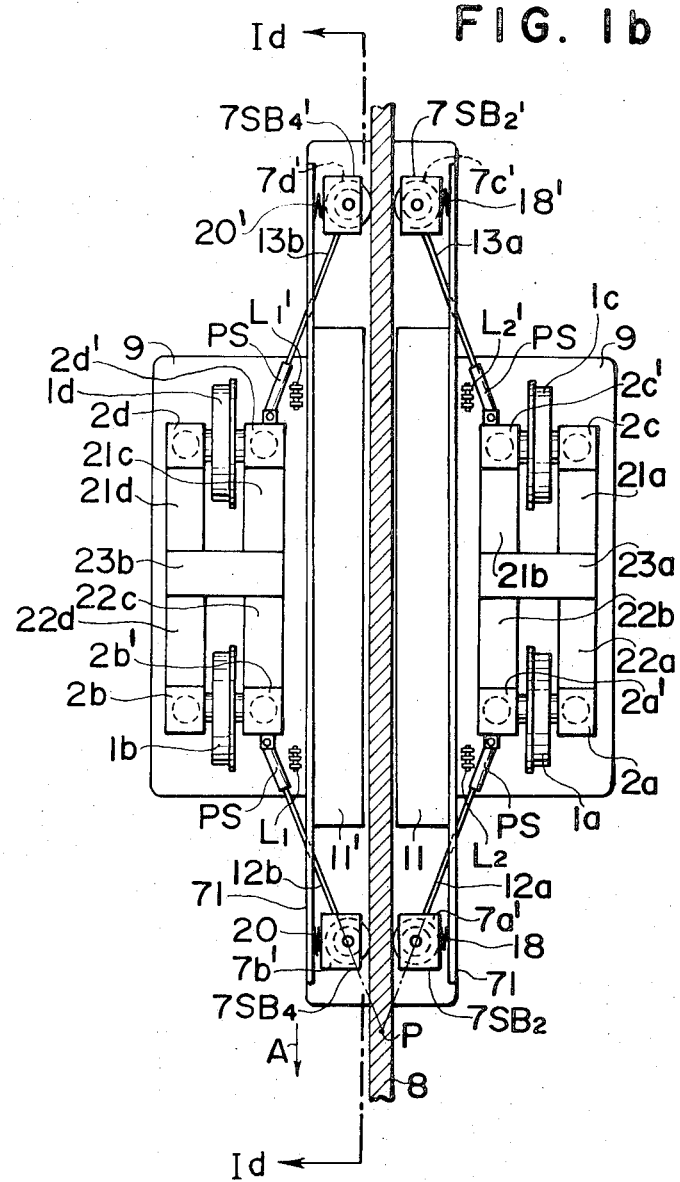

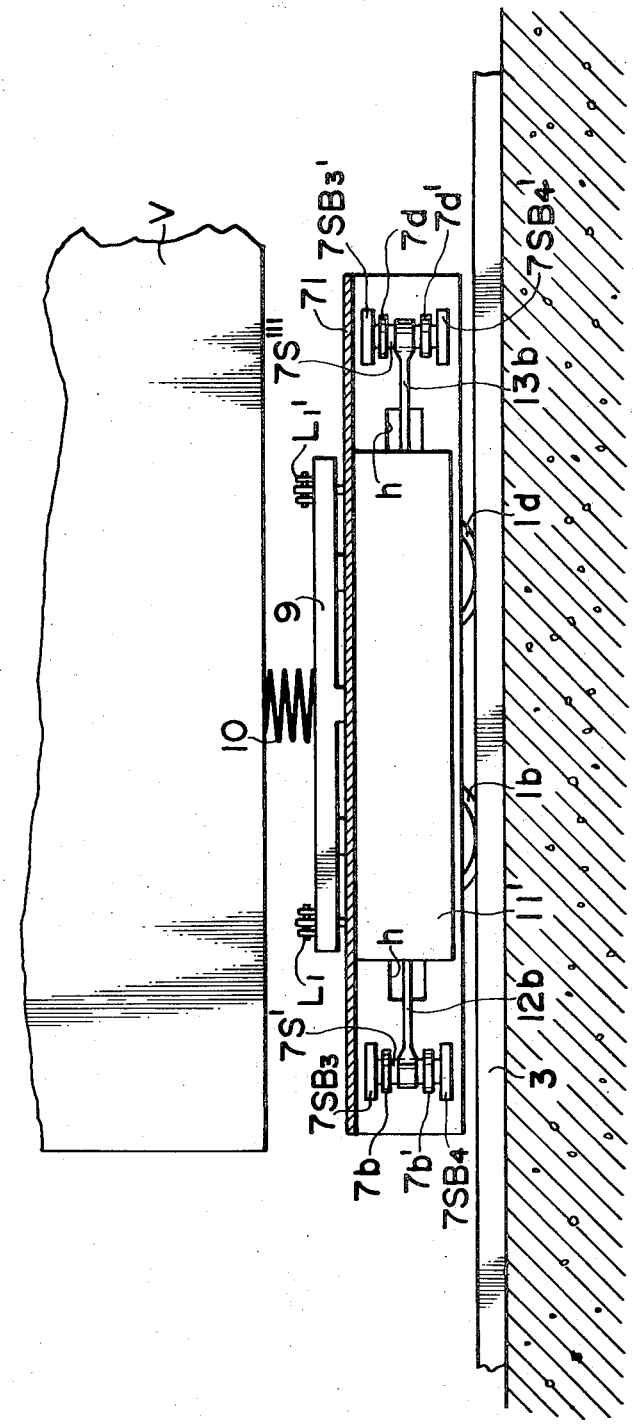

LINEAR MOTOR-DRIVEN RAILWAY TRUCK

BACKGROUND OF THE INVENTION

The present invention relates to a linear motor-driven, guided independent-wheel truck which can run at speeds in excess of 350km/h, with no hunting, and with no reduction of the adhesion coefficient, wherein a mounting frame is attached via suspension links to the underside of the truck frame in the longitudinal direction; on this mounting frame is mounted a vehicle coil, which constitutes a linear motor, and guide wheels. The vehicle coil is so positioned that through electromagnetic coupling with the third rail laid in the direction of the longitudinal axis within the track, it is able to drive the truck by the linear motor. The guides are respectively located under the mounting frame at the front and rear relative to the travel direction of the truck and are located for guiding in contact with both sides of the third rail. On the underside of the truck frame, closer to the longitudinal axis of the truck than said guides, are attached independent wheels in symmetrical positions about the axis of the relative direction of the truck movement, elastically affixed in the vertical direction but rigidly in the horizontal direction.

The said guides located at the front relative to the travel direction of the truck, and the corresponding independent wheels, are coupled together by guide arms. Thereby, the intersection of the two guide arms is designed to form a point, at a location beyond the guide wheel and on the axis of the relative direction of truck movement. Thus, by adopting independent wheels; and by coupling the guide wheel, via guide arms as mentioned above, with the independent wheels, thereby counteracting a lateral displacement of the truck in running and recovering or reinstating the longitudinal axis position of the truck; and by preventing the hunting of the truck through limitation of the compounding of the free movement of a running truck through the wheel-rail frictional force (creep force); and by employing a linear motor drive system, stable running at high speeds in excess of 350km/h, can be assured with no hunting of the truck and no difficulty of adhesion drive.

Railway vehicles of the conventional wheel-suspension type are supported on wheels which roll on the rails; as a result, said wheels are given a torque to roll along the rails and the drive is effected by adhesion between rails and wheels. When, however, such railway vehicles of wheel-suspension type are operated at speeds in excess of 217.7950m/h (350km/h), adhesion drops, while hunting becomes difficult to prevent; and accordingly, stable running cannot be assured.

Of the two problems pointed out in the above, the problem of adhesion drop may be eliminated through, for instance, adoption of a well-known linear motor drive system, but the problem of hunting persists.

The "hunting" mentioned here is a kind of self-excited vibration in a railway vehicle. Essentially it refers to the phenomenon of the rotational movement of a wheel axle (or truck) around the vertical axis, the lateral translation of said movement being compounded through the wheel-rail friction.

Such a self-excited vibration offers no great problem while the running speed is low, but when, for instance, the speed increases to over 217.7950m/h (350km/h), hunting occurs, making stability during high speed operation impossible.

In view of the disadvantages of the wheel-suspension system, a primary object of the present invention is to provide a guided independent-wheel truck that can run with stability, with no reduction of adhesion and no hunting at speeds in excess of 217.7950m/h (350km/h).

A second object of the present invention is to provide a railway vehicle truck characterized in that it has no reduction of adhesion and no occurrence of hunting during running, which are both made possible by the combination of adopting a non-adhesive drive system using a linear motor and using independent wheels, or preferably independent cylindrical wheels to support the vehicle wherein guide wheels affixed at the front in the travel direction of the truck are coupled with the corresponding independent wheels by means of guide arms; and thereby producing the function of restoring or reinstating the truck from its lateral displacement back to the axial position on the track.

In this invention, a mounting frame is attached via suspension links to the underside of the truck frame in the longitudinal direction. On this mounting frame is mounted a vehicle coil, i.e., a component of the linear motor, and guide wheels. The vehicle coil is so positioned that through electromagnetic coupling with the third rail laid in the longitudinal axis direction within the track, it is able to drive the truck by the linear motor. The guide wheels are fitted to the underside of the mounting frame at the front and rear relative to the travel direction of the truck and are located for guiding by contact with both sides of the third rail. To the truck frame are fitted independent wheels, or preferably independent cylindrical wheels, between, for instance, front and rear guide wheels. For the purpose of suspending the truck, there are installed two sets of said independent wheels, each set being fitted symmetrically about the travel axis of the truck frame, elastically in the vertical direction but rigidly in the horizontal direction. The guides located at the front relative to the direction of the truck movement and the corresponding independent wheels, i.e., ones located at the front and closer to said guide wheels, are coupled together by guide arms.

Thereby the intersection of the two guide arms is designed to form a point, at a location beyond the guide wheel, on the axis of the direction of the truck movement.

Thus, by adopting independent wheels; by, as mentioned above, coupling the guide wheels with the independent wheels by means of guide arms; and by producing the function of restoring and reinstating the truck from a lateral displacement, back to the longitudinal axis position, during running and thus limiting the compounding of the free movement of the truck through the wheel-rail frictional force (creep force), it becomes possible to suppress the occurrence of hunting.

Other objects and features of the present invention will be made clear by reading the following description together with the accompanying drawings.

SUMMARY OF THE INVENTION

Most broadly stated, the present invention is comprised of an improved truck structure in a railway car wherein is provided the adaptation of a combination of structure composed of a linear motor and independent wheels wherein guide wheels adapted for contacting the third rail are on axles and resiliently attached to a mounting frame, and are also attached to the independent wheels by guide arms and wherein the independent wheels are affixed elastically in the vertical direction but rigidly in the horizontal direction.

BRIEF DESCRIPTION OF THE DRAWINGS

FIG. 1b is a bottom view corresponding to FIG. 1a.

FIG. 1c is a front view corresponding to FIG. 1a.

FIG. 1d is a sectional view along the 1D-1D line of FIG. 1b.

Referring to FIG. 1a - FIG. 3c and FIGS. 4b, c the structure of a guided independent-wheel truck according to the present invention is to be described.

In FIGS. 1a - d, 9 is the truck frame, on the top of which is connected by a bolster spring 10 in the conventional manner a body V, as illustrated in FIGS. 1a, c, d. From the underside of the truck frame 9 in the longitudinal axis direction, using suspension links $L_1$, $L_2$, $L_1'$, $L_2'$, a mounting frame 71 with an inverted square-U section is hung.

In the present embodiment, the front and rear ends of the mounting frame 71 are constructed in such a manner as to protrude beyond the truck frame 9 by equal distances. The lateral width of the mounting frame 71 is less than that of the truck frame 9; and in a free state, both sides of the mounting frame 71 are positioned approximately symmetrically about the longitudinal axis of the truck frame 9.

Figure 1A:
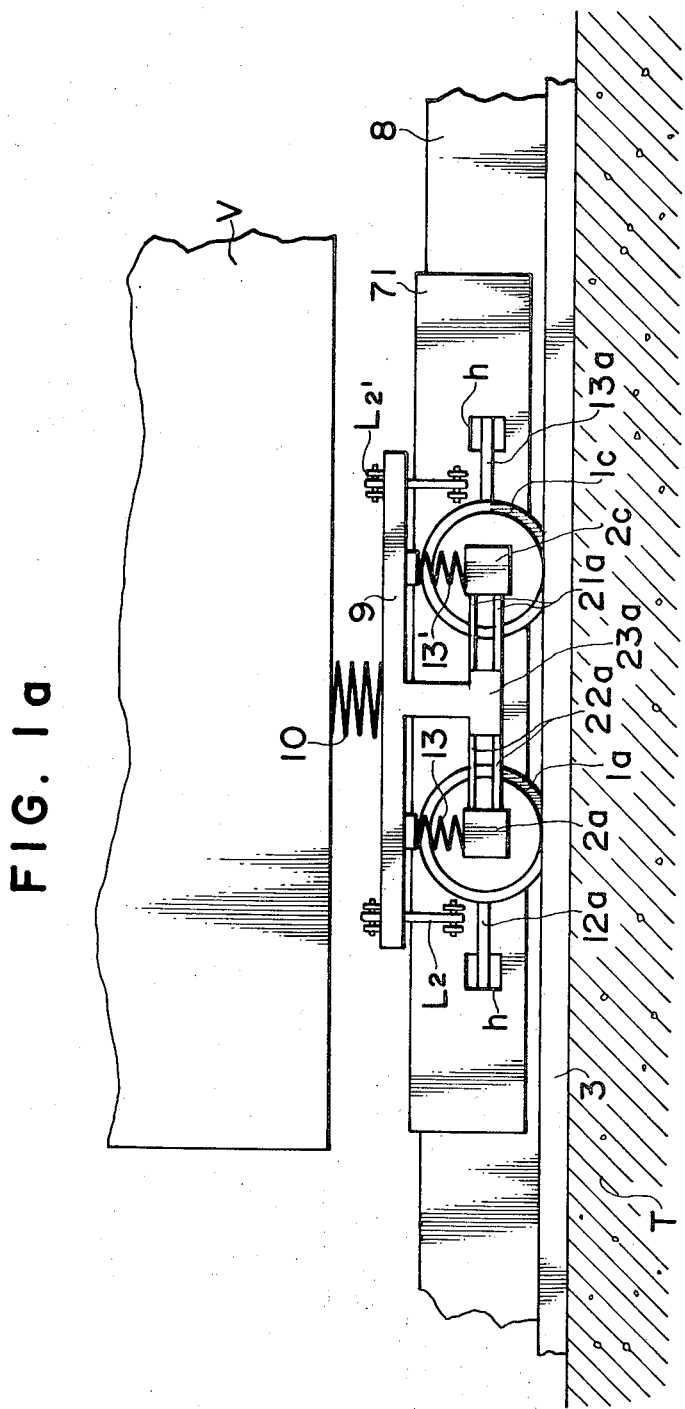
FIG. 1a is a side elevation view of an embodiment of the present invention.
Figure 1C:
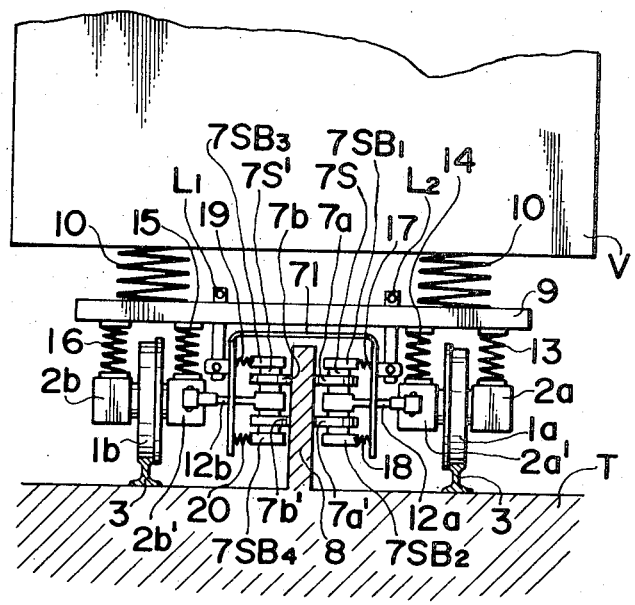
Figure 2:
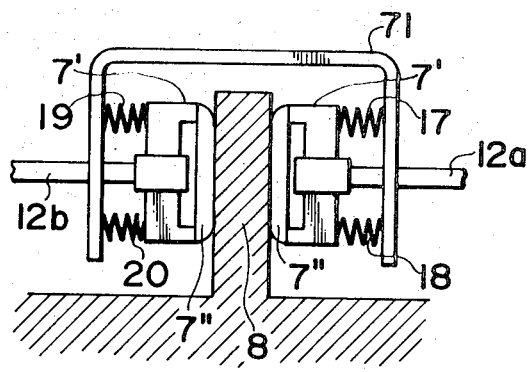
FIG. 2 is an enlarged side view of another embodiment of a guide.

On the underside of the mounting frame 71 in the longitudinal axis direction are fixed vehicle coils 11, 11' with a definite spacing. These coils 11, 11' constitute a well-known linear motor and they are so attached that both sides of the third rail 8 are laid in the longitudinal axis direction within the track, and the opposite surfaces of said coils may be separated horizontally by the specified gap. In this case, it is a known fact that the truck 9 can be driven by the linear motor, regardless of whether the third rail 8 or the vehicle coils 11, 11' is taken on the primary side; and whether the third rail 8 and the vehicle coil 11 are separated in opposite positions horizontally or vertically. The present embodiment illustrates a drive system of vertical arrangement type, taking the vehicle coil 11 on the primary side and the third rail 8 on the secondary side. On both the inner sides of the mounting frame 71 at the front in the relative direction of truck movement are, as illustrated in FIG. 1c in approximate symmetry about the third rail 8, attached the axle boxes $7SB_1$, $7SB_2$, $7SB_4$ and $7SB_5$ for the axles 7S and 7S' of the guide wheels 7a-7b, respectively via the springs 17, 18, 19 and 20; and contacting both the corresponding sides of the third rail 8, the guide wheels 7a-7b' are pressed rotatably by a definite force of said springs 17-20. Also, at the rear end of the mounting frame 71 in the relative travel direction of the truck 9 are arranged, as indicated in FIG. 1b, the guide wheels 7c-7d' in the same symmetrical layout as above with the front end of the mounting frame, 71 where the central axis of the truck is a center. It is possible to employ, as illustrated in FIG. 2, a guide 7' with a sledge like shoe 7'' slidable along the opposite surface of the third rail 8 instead of the guide wheels 7a -7d' as represented in FIGS. 1b–d. A sledge like shoe 7'' may be made of, for example, chrome-molybdenum steel. In FIGS. 1a–c and 2, the same components are denoted by the same symbols.

Incidentally, in FIG. 1b and 1d 7c' corresponds to 7a', 7c (not shown) to 7a, 7d' to 7b', 7d to 7b, $7SB_3$, $7SB_4$ to $7SB_3'$, $7SB_4'$ and $7SB_1'$, $7SB_2'$ (not shown) to $7SB_1$, $7SB_2$ respectively.

Below both outer sides of the mounting frame 71 in the relative travel direction of the truck frame 9 are attached two each, i.e., four independent wheels in total, 1a–1d, approximately in symmetrical position about the longitudinal axis of said truck, so that they can support the truck.

As shown in FIG. 1c, the axleboxes 2a, 2a', 2b, 2b' of the independent wheels 1a and 1b are fitted via the springs 13, 14, 15, 16 to the corresponding parts of the truck 9 and they are adapted to roll along the rails 3 laid in the track T.

The independent wheels 1c, 1d, just like 1a, 1b, are fitted to the appropriate parts of the truck. The axleboxes 2a–2c, 2a'–2c', 2b'–2d', 2b–2d located correspondingly in the same relative direction of movement as the independent wheels, such as 1a and 1c, and 1b and 1d are, as illustrated in FIG. 1b, rigidly connected to the midpoints 23a–23b by means of, for instance, highly stiff leaf springs 21a, 22a, 21b, 22b, 21c, 22c, 21d, 22d; and these midpoints 23a–23b are respectively connected to the opposite faces of the truck. Thus, each independent wheel, relative to the corresponding part of the truck frame 9, is elastically fitted in the vertical direction but rigidly in the horizontal direction. In this invention, cylindrical wheels are used as the independent wheels. Cylindrical wheels are defined as those with the tread formed such that even when the center of axles deviate from the axis of the track and leans to one side, there cannot occur any difference in the radius. FIG. 3b, 3c illustrate some examples of the above-mentioned cylindrical wheels, the ones 1a, 1b in FIG. 3b having the whole tread 1 on the same radius and the ones 1a', 1b' in FIG. 3c having tread profile 1' formed symmetrically about a neutral position. FIG. 3b and c illustrate flanged wheels, but the presence or absence of a flange F has no direct relation with the present invention. The same elements are denoted by the same symbols in FIG. 3b, c and in FIGS. 1a–d.

The midpoints in the vertical direction of the axles 7S, 7S' of the guide wheels 7a-7b' located at the front in the relative direction of truck movement, and the corresponding points of the inner axle boxes 2a', 2b' of the independent wheels located in the relative direction of truck movement are respectively coupled by means of guide arms 12a, 12b composed of link mechanisms.

Figure 4A:
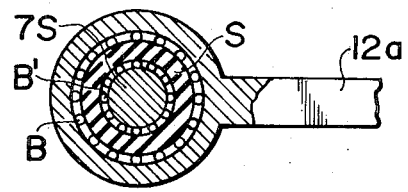
FIG. 4a is an enlarged sectional view of an example coupling the tip of guide arm and independent wheels corresponding to FIGS. 1a - c.

Thereby, one end of the guide arm 12a and the corresponding guide wheel axles 7S are, as shown in FIG. 4a, attached rotatably through some resilient means S (spring) such as anti-vibration rubber with a specified spring constant. Ball bearings B are disposed between the inner periphery of the end of the guide arm 12a and outer periphery of the resilient means S; ball bearing B' between the inner periphery of resilient means and outer periphery of the axle 7S and ball bearing B and B' are disposed rotatable along, say, slots formed on the corresponding outer and inner peripheries as is well-known. One end of the guide arms 12 b is also attached rotatably to the corresponding guide wheel axles 7S' in the same way. The independent wheels 1a and 1b are arranged symmetrically about the longitudinal axis of the truck, while the axle boxes 2a', and 2b' are arranged outside of the independent wheels 1a, 1b at symmetrical positions about the running axis of the truck. Thus, in a free state, said guide arms 12a, 12b, are also roughly symmetrically located about the running axis of the truck. In this case, the intersection P of said guide arms 12a, 12b is designed to be located beyond the guide wheels 7a', 7b' in the relative direction of truck movement A. The inner axleboxes 2c', 2d' of the independent wheels 1c-1d located at the rear in the relative direction of truck movement may also be coupled similarly via the corresponding axles of the guide wheels 7c, 7d and the guide arms 13a, 13b. As for the guide arms 12a, 12b, 13a, 13b; those located at the front relative to the direction of movement are held in coupled state, while those at the rear are uncoupled. In FIG. 1a, h denotes a hole bored in the part of the mounting frame 71, where the guide arms 12a, 13b penetrate.

Figure 4B:
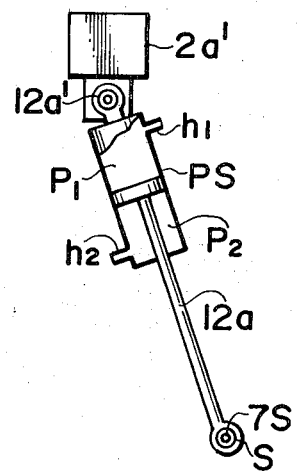
FIG. 4b is a plane view illustrating the couple-uncouple mechanism of the guide arm.

An example of the mechanism by which the coupling between guide wheels and independent wheels by guide arms is tightened or relaxed, depending on the change in the direction of truck movement is illustrated in FIG. 4b; this is a case of a well-known hydraulic pressure mechanism PS being applied for the purpose of tension and release. In FIG. 4b one end of a piston PS is rotatably hinged by means of, for instance, a pin 12a' to the corresponding axleboxes 2a' of, for instance, an independent wheel 1a. The other end of a rod 12a corresponding to the piston rod of said piston PS is fitted rotatably to the axle 7S of the corresponding guide wheel 7a, 7a' as shown in FIG. 4a.

When, in the above mechanism using guide arms, it is desired to maintain the tension of coupling, such as by operation of a hydraulic pressure control device (not shown) mounted aboard the vehicle and in accordance with a known method, oil is sent through the hole $h_1$, $h_2$, into the chamber $P_1$, $P_2$ of the piston PS, thereby producing a hydraulic pressure to maintain the tension. If its desired to release the tension, by the same known method the oil is drained through the hole $h_1$, $h_2$ thereby releasing the tension.

In this manner, the effect of this invention, as described later, can be attained by, depending on the relative direction of truck movement, maintaining the tight coupled state of the guide arm located at the front in the relative direction of movement and uncoupling the guide arm located at the rear. In the embodiment cited above, the guide arms 12a-13b respectively serving as the shafts for the guide wheels 7a-7d' are inserted between the axle boxes of the corresponding independent wheels, but if need be, the guide arms serving the above-mentioned purpose may be introduced at appropriate positions between guide wheels and truck frame.

Though not shown, a truck of the same structure and layout as the one described above is installed rearward relative to the progress of the vehicle in a perfectly symmetrical position about the transverse axis of the vehicle. In other words, the vehicle can be run on these two trucks installed below in the front and rearward.

The following account refers to the running behaviour of the truck installed in front as illustrated in FIGS. 1-4b, but the rearward truck functions absolutely the same as the front one. Thus, the performance of these two trucks can make the vehicle run with the effect, to be described later, of the present invention coming into play.

In this construction, since the truck according to the present invention is driven by a well-known linear motor constituted by the third rail laid within the truck in the direction of truck movement and by the vehicle coil 11 mounted on the truck, there is no reduction of adhesion as encountered with the conventional wheel-suspension truck under high speed running. Thereby, the guide wheels 7a–7d' which are located for guiding by contact with both sides of the third rail 8 under the definite force of a spring, are fitted to the mounting frame 71 via the springs 17–20, while said mounting frame 71 is connected to the track frame 9 via the links $L_1$, $L_2$, $L_1'$, $L_2'$, which are attached symmetrically about the axis of the relative direction of truck movement at the front and at the rear. Therefore, the guide wheels 7a–7d' serve to guide the vehicle coil 11 as well as the truck.

Another advantage of the present invention, in which independent wheels are employed, is that, unlike the conventional railway vehicle equipped with a tapered tread wheel in which the wheels are coupled by an axle, the self-excited vibration of the vehicles during running is essentially non-existent or at least only minimal.

Figure 3A:
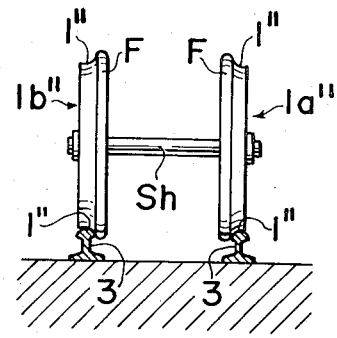
FIG. 3a is a side view illustrating the structure of a railway wheel of the well-known tapered tread type.
Figure 3B:
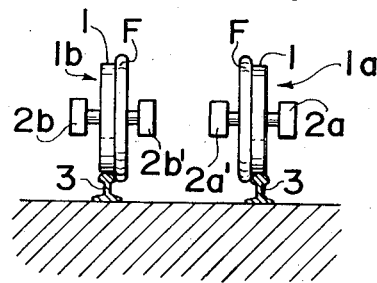
FIG. 3b is a side view showing an example of a cylindrical wheel used as the independent wheel according to the present invention.
Figure 3C:
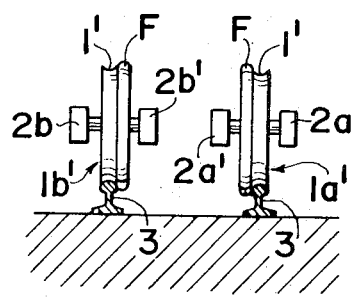
FIG. 3c is a side view illustrating wheels belonging to the category of a cylindrical wheel in FIG. 3b.

FIG. 3a is a side view illustrating a well-known railway wheel 1a'' 1b'' with a tapered tread profile 1''; in this wheel 1a'' 1b'', the tread 1'' formed on the outer edge of the flange F of the wheel 1a'' 1b'' is tapered in such fashion that the radius of curve diminishes increasingly outward. Moreover, the conventional railway vehicle has a pair of wheels 1a'' 1b'' of the above-mentioned profile coupled by the axle Sh. Thus, when the vehicle is running, the radial difference on the tapered portion of the wheel is such that the free movement of wheels 1a'' 1b'' is compounded with the wheel-rail frictional force (creep force), and in consequence the so-called self-excited vibration is induced.

To avoid such a compounding phenomenon as far as possible, the present invention discloses as the best solution the adoption of an independent wheel whose tread is formed as mentioned above in referring to FIGS. 3b, c. Adoption of an independent wheel with such a tread profile will eliminate the possibility of the free movement of a running truck being compounded with the wheel-rail frictional force (creep force). Thus the hunting, i.e., one of the problems is high-speed running of the conventional wheel-suspension truck, can be eliminated.

As described above, a cylindrical formulation of the independent wheels 1a–1d can eliminate one of the factors of hunting, but this entails the following problem.

Namely, when the cylindrical wheels as illustrated in FIG. 3b, c are used as independent wheels, the truck runs leaning to one side unless a restoring mechanism to bring it back to the center of track is provided. The result is that there occurs a forced vibration of the truck due to track irregularities and a consequent wear of wheels is produced, which is likely to lead to track destruction. To avoid such a problem in accordance with the present invention, the axles 7S–7S' of, for instance, the guide wheels 7a–7b' at the front in the relative direction of truck movement and the inner axleboxes 2a', 2b' of the independent wheels 1a, 1b which are also at the front, are coupled together by means of the guide arms 12a, 12b and thereby the function of restoring or reinstating a running truck to the track center is provided. Under this arrangement, the truck 9, while running, is permitted to make a rotational displacement around the intersection P of the guide arms 12a, 12b.

The intersection P is designed to form a point, at a location beyond the guide wheels 7a–7b', on the axis of the truck; in addition, the independent wheels 1a–1d are fitted to the truck 9 via the springs 13–16. Thus, in case the truck 9, while running, makes a lateral displacement, it makes at the same time an angular displacement around the vertical axis. Thereby the direction of truck displacement is contrary to the direction of truck movement and, accordingly, a slip occurs between wheel and rail 3. This slip acts as the restoring force to overcome the lateral displacement and as a consequence, the running truck can be restored to the track center. However, when the movement of a running truck is restricted by the above-mentioned guide arms 12a, 12b, the free movement of the truck is likely to be compounded by the frictional force between wheel and rail; though it is different from the hunting in the conventional truck, a self-excited vibration will be caused. This self-excited vibration can be prevented, however, by setting an appropriate spring constant for the resilient means S such as an anti-vibration rubber, as illustrated in FIG. 4a, through which one end of the guide arms 12a, 12b are coupled to the guide wheel axle 7S, 7S'.

The above embodiment concerns the case of the guide wheels 7a–7b' in FIGS. 1a–d being positioned to the front end of the truck in the relative direction of its movement, but a similar effect will be achieved also in the case of the guide wheels 7c–7d' being positioned with regard to the front end of the truck in the relative direction of its movement, provided the guide wheels 7c–7d' are coupled in a tensioned state through the guide arms 13a, 13b to the independent wheels 1c, 1d; in this case, however, as mentioned above, the guide arms 12a, 12b are to be held in released state.

Further, according to the present invention, the mounting frame 71, the vehicle coil 11 attached centrally on the underside of this frame, and the guide wheels 7a–7d' are connected via the suspension links $L_1$, $L_2$, $L_1'$, $L_2'$ to the truck 9; and therefore the weight of these guide wheels 7a–7d' and the vehicle coil 11 are transmitted to the springs 13–16. If, thereby, the intersections of the suspension links $L_1$, $L_2$, $L_1'$, $L_2'$, are made to fall on a point on the vertical axis which is as high as possible above the axis of truck movement, or, preferably, if these links in a free state are set parallel with no intersection or set at infinite height, the movement of a running truck can be cut off from the motion of the mounting frame 71, which is desirable for high speed running of the truck constructed according to the present invention.

Thus, according to the present invention, the difficulty of adhesion drive experienced in operating railway vehicles at speeds in excess of 217.7950m/h (350 km/h) will be eliminated through adoption of a linear motor drive system. Meanwhile, since the vehicle part of the linear motor is attached to the underside of the truck center, independent wheels are adopted, thereby rendering the installation of an axle needless.

As described above, the guide wheels and cylindrical independent wheels are coupled together by guide arms, thereby preventing hunting. Moreover, the movement of a running truck and the motion of the mounting frame are isolated from each other as far as possible. Thus a truck structure that can run at high speed with full stability has come into being. Other variations and modifications of this invention will be apparent to those skilled in the art.

What is claimed is:

1. A linear motor-driven, guided, independent wheel truck, comprising:
   a. a mounting frame attached to the truck frame by means of suspension links, said mounting frame being connected with a vehicle part of a linear motor and guides, said vehicle part of a linear motor being fitted to the truck in the longitudinal direction, and said guides being installed for guiding contact with both sides of the third rail laid along the axis of the track, at the front and rear in the direction of truck progress; and
   b. cylindrical independent wheels which are fitted to the underside of the truck frame in a symmetrical position about the longitudinal axis of the truck, elastic in the vertical direction but rigid in the horizontal direction, said cylindrical independent wheels being connected through axle boses to said guide by means of guide arms, and the intersection of said guide arms forming a point, at a location beyond the guide, on the axis of truck movement wherein the truck frame can rotate only about a vertical axis extending through said point of intersection of said guide arms.

2. A linear motor-driven, guided, independent wheel truck according to claim 1, wherein the intersection of a pair of suspension links which connect the mounting frame and the truck frame, i.e., the elastic suspension center of the mounting frame is located high enough to isolate the movement of the truck frame from the motion of mounting frame as far as possible during running.

3. A linear motor-driven, guided, independent wheel truck according to claim 1, wherein, the guide unit is so constituted that it can serve not only as the guide for the truck but also as the guide for the vehicle part of the linear-motor.

4. A linear motor-driven, guided, independent wheel truck according to claim 1, wherein guide arms are provided also at the rear end of the truck in the direction of movement, thereby making it possible that, depending on the change of the direction of movement of a running truck, the coupling of guides and independent wheels by guide arms at said rear end of the truck is released.

5. A linear motor-driven, guided, independent wheel truck according to claim 4, wherein the coupling and uncoupling of guide arms is produced by the hydraulic pressure action in a hydraulic means attached to the guide arms.

6. A linear motor-driven, guided, independent wheel-truck according to claim 1, wherein a vehicle coil is mounted on the mounting frame and so positioned that through electromagnetic coupling with the third rail, the truck is driven by the linear motor.

7. A linear motor-driven, guided, independent wheel-truck according to claim 1, wherein the guides are constructed in the form of guide wheels fitted to the underside of the mounting frame at the front and rear of the truck relative to the travel direction of said truck, and said wheels are positioned in contact with the sides of the third rail.

8. A linear motor-driven, guided, independent wheel-truck according to claim 7, wherein there are a plurality of guide wheels in contact with each side of the third rail and said guide wheels on each side are respectively connected by axles which terminate at both ends in axle boxes which are elastically connected to said mounting frame.

9. A linear motor-driven, guided, independent wheel-truck according to claim 1, wherein the guides are constructed in the form of a sledge-like shoe adopted to slide along opposite surfaces of the third rail.

10. A linear motor-driven, guided, independent wheel-truck according to claim 1, wherein the elastic vertical fitting of the wheels comprises suspending the axle boxes from the truck frame by spring means.

11. A linear motor-driven, guided, independent wheel-truck according to claim 1, wherein the rigid horizontal fitting of the wheels comprises rigidly connecting the axle boxes by highly stiff leaf springs to midpoints which are respectively connected to the opposite faces of the truck.

* * * * *